K. A. HEIDL.
LAWN TRIMMER.
APPLICATION FILED MAR. 29, 1916.
1,222,950.
Patented Apr. 17, 1917.
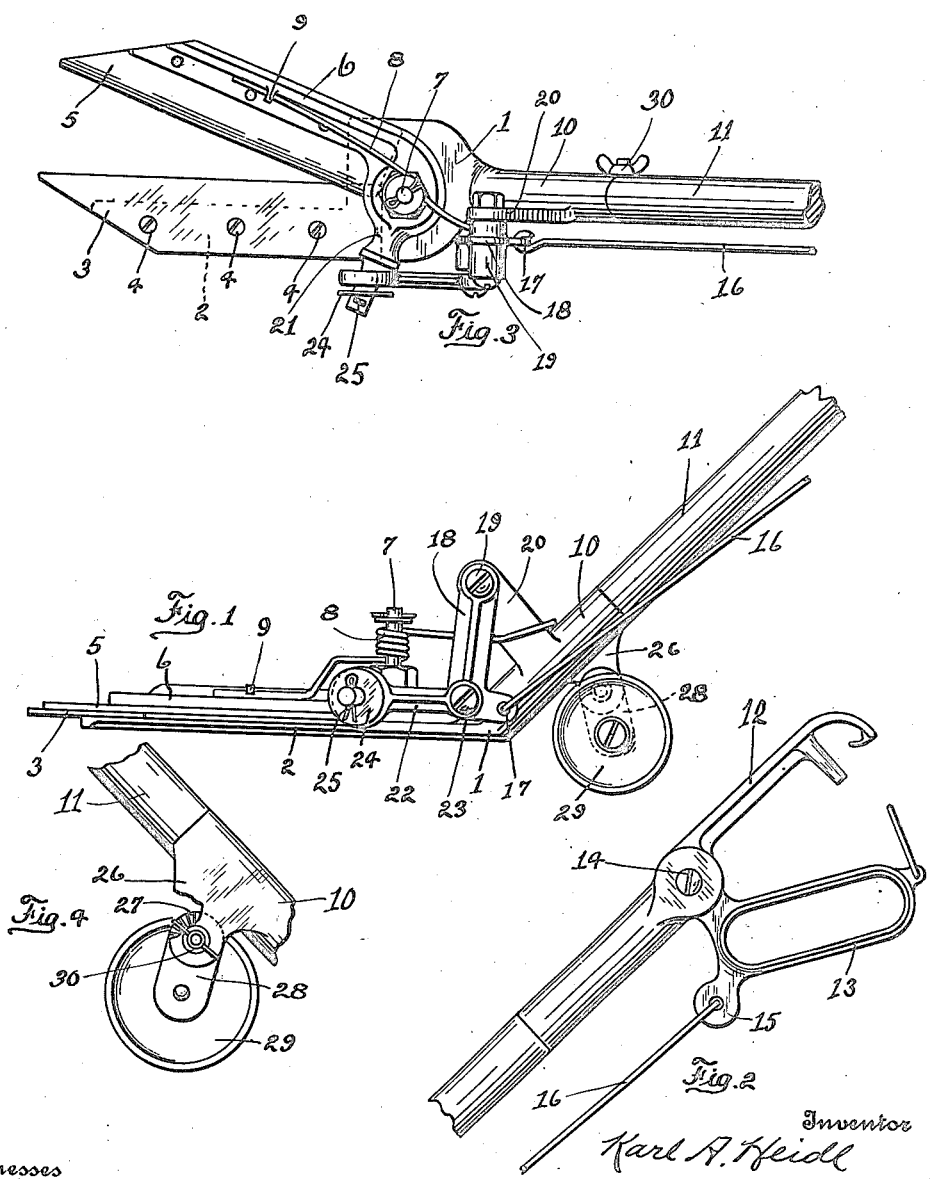

UNITED STATES PATENT OFFICE.

KARL A. HEIDL, OF COLUMBUS, OHIO.

LAWN-TRIMMER.

1,222,950.

Specification of Letters Patent.   Patented Apr. 17, 1917.

Application filed March 29, 1916.   Serial No. 87,628.

*To all whom it may concern:*

Be it known that I, KARL A. HEIDL, a subject of the King of Austria, residing at Columbus, in the county of Franklin and State of Ohio, have invented certain new and useful Improvements in Lawn-Trimmers, of which the following is a specification.

This invention relates to lawn trimmers and is designed for use by gardeners, etc., for trimming the edges of a lawn after the same has been cut with a lawn mower. Further, the device may be effectively used for removing or closely cutting weeds either in the lawn or flower beds.

Primarily, my invention contemplates the provision of a lawn trimmer of this type which may be used by the operator with a minimum of effort and exertion. To this end, the main object of my invention, therefore, resides in the provision of a lawn trimmer of this type having a handle of sufficient length and of a proper angle to permit the operator to stand in a substantially erect position when using the same, together with operating means for the shear structure carried by the upper end of the handle.

A further object of my invention is the shear structure itself which is so arranged that one blade remains in a stationary position while the other blade is movable to effect the cutting. By this means, the one blade may be taken as the gage member and, therefore, the operator may readily determine just what amount and where the grass may be cut.

Still a further object of my invention resides in the provision of a structure whereby the distance between the shear blades and the ground line may be regulated. By means of this adjustment, the height of the remaining grass may be readily determined and be maintained uniform throughout the entire cutting.

The preferred embodiment of my invention is shown in the accompanying sheet of drawings, in which similar characters of reference designate corresponding parts, and in which:

Figure 1 is a view in side elevation of the lower end of my lawn trimmer,

Fig. 2 is a view in side elevation of the upper end or operating end of the trimmer, Fig. 3 is a top plan view of the structure shown in Fig. 1, and, Fig. 4 is an enlarged detail view of the adjustment for the roller support with parts broken away.

In these several views, there is shown a base unit or casting 1, provided with a forwardly projecting ear 2, onto which the stationary shear blade 3 is secured by means of the screws 4. Pivotally mounted in connection with the base unit 1 is the movable shear blade which is shown at 5, this shear blade being securely fastened to the casting shown at 6 and the two being pivoted together by the bolt shown at 7. A coil spring 8 is used for normally maintaining the movable blade in open position and as is shown in Fig. 3, this spring encircles the bolt 7 and is held against removal by means of the washer and cotter pin in the manner shown and engages the casting 6 beneath a lip 9. The casting 1 is provided with a rearwardly and upwardly projecting socket portion 10, into which the handle or reach rod 11 is securely fastened. The upper end of this handle is provided with a grip portion 12 and an operating member 13, which latter is pivoted as is shown at 14. This operating member is provided with a pierced ear 15 and to this latter there is secured a connecting rod 16. The lower end of this connecting rod is pivotally connected at 17 to one arm of a bell crank 18. The opposite arm of the bell crank is pivotally connected at 19 to an upstanding finger 20 formed on the socket portion 10 of the base member. The casting 6 onto which the movable shear blade 5 is secured, is also provided with a lateral extension 21 and this lateral extension is connected with the bell crank through the medium of a link shown at 22, the link being pivotally connected to this bell crank, as is shown at 23. The manner of connecting the link to the lateral extension 21 is best shown in Fig. 3, from which it will be apparent that the hole is of a size slightly larger than the end of this extension, so that a slight universal movement may be effected, the link itself being held in position by means of a washer 24 and a cotter pin 25. The socket portion 10 of the base unit 1 is also provided with a down-standing fin 26, one side of which is serrated to securely grip a complementally serrated surface 27 of the bracket member 28, which rotatably holds the wheel 29. The bracket arm 28 may be held in any adjusted position by tightening of the butterfly nut shown at 30 and it is by means of this adjustment that the distance between the ground line and the shear blades may be regulated.

From the foregoing description, taken in connection with the accompanying sheet of drawings, it will be apparent that I have provided a type of lawn trimmer wherein one of the blades, namely the blade designated 3, may be used as a gage member for determining the position of the implement as a whole and for guiding the operator during the cutting operation. Further, the roller 29 may be used for regulating the distance between the shear blades and the ground line. When it is desired to cut weeds out of a lawn only, it will be understood that the shear blades may be inclined downwardly slightly and the points of the blades used only in severing the weeds close to the ground.

What I claim, is:

A lawn trimmer comprising a base unit, a handle rigidly attached to said unit, a shear blade rigidly carried by said unit, a second shear blade pivotally attached to said unit, a lateral extension on said second shear blade, an arm pivoted at one end to said base unit, a link pivoted to the opposite end of said arm and said lateral extension, and an actuating rod also operatively connected to the end of said arm to which said link is connected.

In testimony whereof I affix my signature in presence of two witnesses.

KARL A. HEIDL.

Witnesses:
C. C. SHEPHERD,
WALTER E. L. BOCK.